June 26, 1928.

A. J. JANSSON 1,674,647

CUSHION CONNECTION FOR VEHICLE CONSTRUCTION

Filed Feb. 25, 1926

Inventor
Axel J. Jansson
By his Attorneys
Redding, Greeley, O'Shea & Campbell

Patented June 26, 1928.

UNITED STATES PATENT OFFICE.

1,674,647

AXEL J. JANSSON, OF HILLSIDE, NEW JERSEY, ASSIGNOR, BY MESNE ASSIGNMENTS, TO INTERNATIONAL MOTOR COMPANY, OF NEW YORK, N. Y., A CORPORATION OF DELAWARE.

CUSHION CONNECTION FOR VEHICLE CONSTRUCTION.

Application filed February 25, 1926. Serial No. 90,492.

This invention relates to a connection and support between parts preferably of a vehicle, one of which parts is to be connected to and supported by the other part. More particularly the invention relates to a connection and support of yielding non-metallic material adapted to be interposed between the end of a vehicle leaf spring and the chassis frame whereby shocks and stresses ordinarily impressed upon the road wheels of the vehicle are cushioned or absorbed and their transmission to the chassis frame prevented. The invention also seeks to provide a construction wherein all metal to metal contact is avoided thus doing away with the necessity of lubrication. A further object of the invention has to do with the provision of a practical cushion connection of the character described of extreme simplicity and requisite strength while still affording capacity for movement in the connection under conditions of spring elongation. According to the invention the end of the spring is engaged by a block of yielding non-metallic material and a portion of the block spaced from the spring engaging portion is carried with the vehicle frame and a bolt carried with the non-metallic material passes through an aperture in the spring end to prevent separation of the parts and contribute to the compression of the yielding non-metallic material through the instrumentality of a cup-shaped guard or housing surrounding the spring retaining portion of the material. The yielding non-metallic material of which the connection is composed is preferably rubber and it is retained under internal static pressure since by so retaining it, its strength, resiliency and wearing qualities are improved. These and other objects of the invention and the means for their attainment will be more apparent from the following detailed description of a preferred embodiment thereof which is illustrated in the accompanying drawings and in which:

In the patent to Alfred F. Masury and August H. Leipert No. 1,404,876 dated January 31, 1922, there is disclosed a cushion connection for vehicle construction in which the end of the spring is engaged by yielding non-metallic material with the vehicle frame. The present invention seeks to provide a cushion connection of the same general character but one in which extreme latitude is afforded the spring for elongation. To this end the yielding non-metallic material $a$ which engages the end of leaf spring $b$ is maintained under compression at that portion engaging the end of the spring by a cup-shaped housing member $c$ substantially rectangular in cross section which is a separate element from the cup-shaped member $d$ securing the upper end of block $a$ to the frame member $e$. Preferably housing $d$ has an open lower side as at $d'$ and is formed with an offset portion $d^2$ which engages a flange $a'$ on the block $a$ and clamps that flange against a plate $i$ to retain the block in position and maintain that portion under compression. If desired that portion of the block engaged by the housing $d$ may be reenforced with cords of fibre or the equivalent.

The yielding non-metallic material is retained under compression laterally about the end of the spring through the instrumentality of the cup $c$ and vertically by a bolt $g$ which serves to hold the cup in place and which also passes through an aperture $b'$ in the end of the spring. To avoid all metal to metal contact between the frame and the spring the upper end of the bolt is seated in a recess formed by a cut-away portion $e'$ in the flange of the frame member $e$, an aperture $i'$ formed in the plate $i$ and a recess $a^2$ formed in the top of the block $a$, the block being prevented from axial displacement by a curved washer $h$ which rests upon the surface of the yielding non-metallic material and is retained in place by a nut $g'$. To facilitate the insertion of the bolt within the block of yielding non-metallic material and to allow for distortion of the material, the passage $a^2$ for the bolt is of increased diameter adjacent that portion of the block which received the end of the spring as at $a^3$, $a^4$, respectively.

Figure 1:
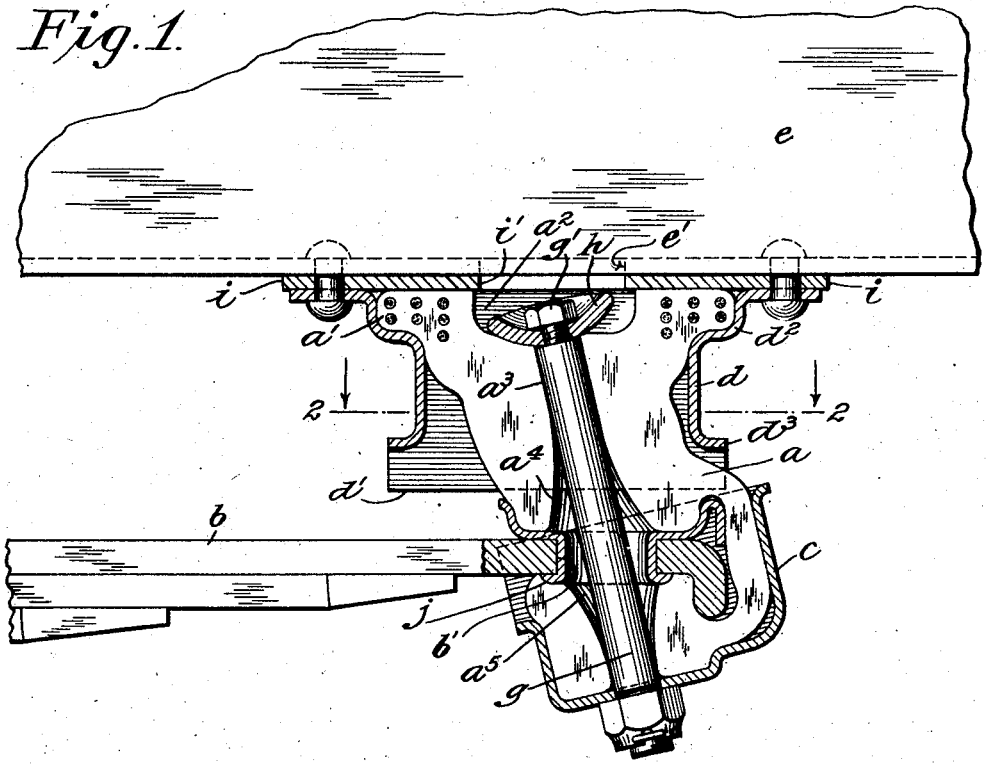
Figure 1 is a view in side elevation and partly in section showing the cushion connection according to the present invention under conditions of extreme spring elongation.
Figure 2:
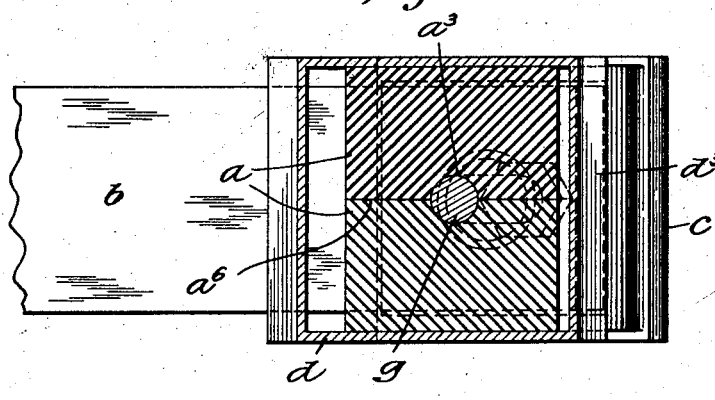
Figure 2 is a horizontal sectional view taken in the plane indicated by the line 2—2 in Figure 1 and looking in the direction of the arrows and showing the connection under conditions of normal load.

It will thus be seen that a cushion connection has been provided which permits the maximum degree of spring elongation, the end walls of the housing being offset and recessed as at $d^3$ to facilitate displacement of the lower end of the block of yielding non-metallic material. To further contribute to the compression of the block and its positioning with respect to the end of the spring a seat member $j$ may be secured within aperture $b'$ which serves to prevent displacement of the upper side of the block. To facilitate assembly the lower half of the block, that is, that portion below the line 2—2 in Figure 1 may be split in a vertical plane including the longitudinal median line of spring $b$ as indicated in Figure 2 at $a^6$.

By the construction described it will be evident that the block of yielding non-metallic material is securely held in position with frame member $e$ while its lower end is permitted a degree of movement to allow for spring deflection. Separation of the parts, however, is prevented by the bolt $g$ which secures the cup in place and which passes through an aperture in the end of the spring, the aperture being of sufficient diameter to prevent a metal to metal contact and the upper end of the bolt being spaced from all metal parts by arrangement within the recess $a^2$.

Various modifications may be made in the arrangement and configuration of the component parts going to make up the cushion connection according to the present invention and no limitation is intended by the foregoing description except as indicated in the accompanying claims.

What I claim is:

1. In a cushion connection of the character described the combination with two parts, one of which parts is to be connected to and supported by the other part, of non-metallic yielding material engaging one of the parts, means to secure said material to the other part, a cup-shaped element to maintain the part engaging portion of said non-metallic yielding material under compression, and means to maintain said cup-shaped element in compression relation with the non-metallic material.

2. In a cushion connection of the character described the combination with two parts, one of which parts is to be connected to and supported by the other part, of non-metallic yielding material engaging one of the parts, means to secure said material to the other part, a cup-shaped element, and a bolt to maintain the cup-shaped element in position.

3. In a cushion connection of the character described the combination with two parts, one of which parts is to be connected to and supported by the other part, of non-metallic yielding material engaging one of the parts, means to secure said material to the other part, a cup shaped element and a bolt carried with the non-metallic material to maintain the cup-shaped element in position.

4. In a cushion connection of the character described, the combination with a vehicle frame member and a leaf spring of a cup-shaped member carried with the frame member, a yielding non-metallic block engaging the end of the spring, means to secure the block within the cup-shaped member, a cup-shaped member enclosing that portion of the block engaging the end of the spring, and a bolt seated within the yielding non-metallic material and retaining the last named cup in position.

This specification signed this 19th day of February, A. D. 1926.

AXEL J. JANSSON.